United States Patent
Tasaka et al.

(10) Patent No.: US 6,449,430 B1
(45) Date of Patent: Sep. 10, 2002

(54) LENS-FITTED PHOTO FILM UNIT AND ASSEMBLING METHOD FOR THE SAME

(75) Inventors: Hisashi Tasaka; Nobuyuki Kameyama, both of Kanagawa; Shozo Kondo, Tokyo, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 17 days.

(21) Appl. No.: 09/702,676

(22) Filed: Nov. 1, 2000

(30) Foreign Application Priority Data

Jan. 11, 1999 (JP) ............................................ 11-310604
Jan. 11, 1999 (JP) ............................................ 11-311350

(51) Int. Cl.[7] ...................... G03B 17/02; G03B 17/00; G03B 13/10
(52) U.S. Cl. .............................. 396/6; 396/73; 396/379
(58) Field of Search ................................ 396/6, 73, 74, 396/378, 379, 535

(56) References Cited

U.S. PATENT DOCUMENTS 3,903,537 A * 9/1975 Ettischer ..................... 396/73

FOREIGN PATENT DOCUMENTS

| JP | 3130734 | 6/1991 |
|---|---|---|
| JP | 7134370 | 5/1995 |

* cited by examiner

Primary Examiner—David M. Gray
Assistant Examiner—Rochelle Blackman
(74) Attorney, Agent, or Firm—Young & Thompson

(57) ABSTRACT

A lens-fitted photo film unit is pre-loaded with photo film. First and second taking lenses are arranged in an arranging direction crosswise to a photographic optical axis, and have focal lengths different from each other. A rotatable lens holder supports the first and second taking lenses. An externally operable button member is operable by external operation, rotates the lens holder in the arranging direction, and sets the first and second taking lenses selectively on the photographic optical axis. A viewfinder optical system is settable at first and second viewfinder magnifications, and adapted to observation of a photographic field. A magnification changer mechanism including a lever is shifted in response to rotation of the lens holder, and sets the viewfinder optical system at the first and second viewfinder magnifications respectively when the first and second taking lenses are set on the photographic optical axis.

28 Claims, 11 Drawing Sheets

LENS-FITTED PHOTO FILM UNIT AND ASSEMBLING METHOD FOR THE SAME

BACKGROUND OF THE INVENTION

1. Field of the Invention

The present invention relates to a lens-fitted photo film unit and an assembling method for the same, and more particularly, relates to a lens-fitted photo film unit having plural taking lenses selectively set on a photographic optical axis according to each of plural modes, and a viewfinder with which a photographic object can be checked differently between the modes, and an assembling method for the same.

2. Description Related to the Prior Art

A lens-fitted photo film unit is known as a single-use camera having a simple structure for taking an exposure and pre-loaded with a photo film cassette. The lens-fitted photo film unit includes a housing and an outer belt or casing. The housing accommodates the photo film cassette. The outer belt covers the housing at least partially, and provided with information and decorative patterns. The housing accommodates a taking lens, shutter mechanism, photo film winder mechanism and the like.

There is a type of the lens-fitted photo film unit having two taking lenses disposed in a lens holder. The taking lenses have different focal lengths. A selected one of the taking lenses is set in a photographic light path by rotating the lens holder according to intention of a user. Thus, one of standard photography and a photography of a specialized mode can be selected.

JP-B 2657104 discloses the lens-fitted photo film unit of an example having a macro lens included in the taking lenses for the close-up photography, and a normal lens included in the taking lenses for the standard photography. When an externally operable member is operated, the lens holder is rotated to set either one of the macro lens and the normal lens in the photographic light path. It is possible to select one of the standard photography and the close-up photography to take an exposure.

JP-A 07-134370 discloses the lens-fitted photo film unit of an example including a first of the taking lenses for the standard photography and a second of the taking lenses having a smaller focal length for panoramic photography. When the externally operable member is operated, the lens holder is rotated to set either one of the taking lenses in the photographic light path. It is possible to select one of the standard photography and the panoramic photography to take an exposure.

In the lens-fitted photo film unit, a viewfinder has a light path positioned differently from the photographic light path. When the taking lenses are changed over, a viewfinder field region must be changed over at the same time according to an angle of frame.

In JP-B 2657104, the viewfinder field region is determined according to a photographing region of the normal lens. There is a target mark, printed on a movable member, and inserted into the viewfinder field region upon setting of the macro lens, for compensating for the parallax.

In JP-A 07-134370, a frame mark for the viewfinder field region is printed according to the photographing region of the taking lens for the standard photography. At the time of the panoramic photography, the panoramic frame mark is inserted in the light path of the viewfinder in response to rotation of the lens holder. The viewfinder field region of the viewfinder is limited panoramically.

However, the target mark and the field region mark have shortcomings in that errors are likely to occur because their visible position are shifted if a user's eye shifts. Furthermore in the field frame mark, there is no change in the size of an object image viewed through the viewfinder even though the size of the object image to be recorded in the photo film is changed by a change of the focal length of the selected taking lens. It is impossible to check the size of the object image visually before an exposure.

It is possible to conceive the lens-fitted photo film unit changeable between the standard photography and telephotography by combining the taking lens having a long focal length. However, the taking lens having the long focal length must be in a position offset forwards from the taking lens having a short focal length. To obtain a space for shifting the taking lens with the long focal length, a lens barrel should have a shape projecting forwards. Alternatively, a projecting portion should be formed with a part of a front cover including the lens barrel.

In FIG. 11, a known lens-fitted photo film unit 140 is changeable between two taking lenses having respective focal lengths. A housing 141 of the lens-fitted photo film unit 140 includes a photo film cassette, a shutter mechanism, and the like. An outer belt 143 is wound about the housing 141 and attached to its front. A front cover 142 is one of outer covers included in the housing 141, and provided with a projecting portion 144, in which a space is kept for accommodating the two taking lenses. The projecting portion 144 has a surface curved in a manner of a quadratic curved surface. The outer belt 143 is wound about the center of the housing 141 in covering the front of the projecting portion 144.

However, a projecting amount of the projecting portion 144 increases according to an increase in the focal length of the taking lens. This results in enlarging the whole size of the lens-fitted photo film unit.

If a front surface of the projecting portion 144 is formed as a cubic curved surface for a design, looseness occurs in the outer belt, which cannot be attached neatly. There is no further variety in modifying the front surface of the projecting portion 144 than quadratic curved surfaces.

SUMMARY OF THE INVENTION

In view of the foregoing problems, an object of the present invention is to provide a lens-fitted photo film unit having plural taking lenses selectively set on a photographic optical axis according to each of plural modes, and a viewfinder with which a photographic object can be checked differently between the modes, and an assembling method for the same.

Another object of the present invention is to provide a lens-fitted photo film unit in which one of plural taking lenses have a long focal length and can be accommodated even in a compact space in an projecting portion of a body, and an assembling method for the same.

In order to achieve the above and other objects and advantages of this invention, a lens-fitted photo film unit is pre-loaded with photo film, and includes first and second taking lenses arranged in an arranging direction crosswise to a photographic optical axis, and having focal lengths different from each other. A movable lens holder supports the first and second taking lenses. An externally operable member is operable by external operation, for moving the lens holder in the arranging direction, to set the first and second taking lenses selectively on the photographic optical axis. A viewfinder optical system is settable at first and second viewfinder magnifications, and adapted to observation of a photographic field. A magnification changer mechanism is shifted in response to movement of the lens holder, for setting the viewfinder optical system at the first and second viewfinder magnifications respectively when the first and second taking lenses are set on the photographic optical axis.

The viewfinder optical system includes an objective lens, an eyepiece lens and a movable lens disposed therebetween. The magnification changer mechanism moves the movable lens along a viewfinder optical axis.

Furthermore, a front cover covers a front of the lens holder. A slot is formed in the front cover. The externally operable member is movable through the slot by external operation.

The lens holder, when in the first position, sets the first taking lens on the photographic optical axis, and when in the second position, sets the second taking lens on the photographic optical axis. Furthermore, a holder stopper mechanism prevents the lens holder from moving out of an orbit between the first and second positions.

The lens holder is rotatable about a rotational center thereof, the rotational center is disposed under the photographic optical axis. The externally operable member is disposed between the rotational center and the first and second taking lenses.

Furthermore, a shutter mechanism is actuated upon a releasing operation, for providing an exposure in the photo film. A lock mechanism allows the releasing operation if the lens holder is in the first or second position, and inhibits the releasing operation if the lens holder is between the first and second positions.

Furthermore, a first toggle spring has one end secured to the lens holder, for biasing the lens holder toward the first and second positions respectively when the lens holder is offset from a dead point toward the first and second positions.

The holder stopper mechanism includes first and second stopper walls, disposed on sides of a rotational orbit of the lens holder, for contacting the lens holder.

In another preferred embodiment, the holder stopper mechanism includes a stationary stopper pin. An arc-shaped slot or recess is formed in the lens holder, has an arc shape with reference to the rotational center, has first and second ends, for receiving insertion of the stopper pin, the first and second ends being contacted by the stopper pin, to set the lens holder in respectively the first and second positions.

Furthermore, first and second apertures are formed in the lens holder behind respectively the first and second taking lenses, the first aperture being positioned at a level in front of a level of the second aperture.

Furthermore, a light-shielded tunnel is disposed between the lens holder and the photo film, for shielding ambient light from a light path defined along the photographic optical axis. A light restricting aperture is disposed in the light-shielded tunnel, and has a size associated with effective flux for exposure through the first taking lens. An anti-reflection member is disposed on an inner face of the light-shielded tunnel and between the light restricting aperture and the photo film, for absorbing unwanted light having passed the second taking lens and an edge portion of the light restricting aperture while the effective flux for exposure through the second taking lens comes incident upon the photo film.

The shutter mechanism includes a shutter blade for opening/shutting a light path along the photographic optical axis, the shutter blade being rotatable in a blade rotating orbit. The first toggle spring is movable in a spring moving orbit disposed opposite to the blade rotating orbit with reference to the photographic optical axis.

The first toggle spring includes a coil portion. Furthermore, a support wall supports a rear of the lens holder movably. A recess is formed in the support wall, for receiving entry of the coil portion when the first toggle spring moves.

The magnification changer mechanism sets the movable lens in first and second lens positions on the viewfinder optical axis respectively when the lens holder is in the first and second positions. Furthermore, a second toggle spring has one end secured to the movable lens, for biasing the movable lens toward the first and second lens positions respectively when the movable lens is offset from a dead point toward the first and second lens positions.

The magnification changer mechanism includes a transmission lever, has a driven end and a driving end, the driven end being moved by rotation of the lens holder, for causing the driving end to move the movable lens along the viewfinder optical axis.

Furthermore, a lens stopper mechanism prevents the movable lens from moving away from an orbit between the first and second lens positions. While the lens holder is rotated toward the first and second positions, the second toggle spring starts the transmission lever to rotate with the driving end, for moving the movable lens respectively to the first and second lens positions. When the lens holder is rotated to the first and second positions, the driven end is disengaged from the lens holder.

Furthermore, a housing is pre-loaded with the photo film, for containing the first and second taking lenses, the lens holder and the viewfinder optical system. A central opening is formed in a portion of a front wall of the housing positioned at least on the photographic optical axis. An auxiliary cover member is secured to the housing to cover the central opening, and has one portion for introducing light from the photographic field to the first or second taking lens.

Furthermore, an outer sheet member covers at least a partial surface of the housing.

The auxiliary cover member is secured to the housing removably, and the externally operable member is movable on the auxiliary cover member.

The outer sheet member has at least one portion disposed between the auxiliary cover member and the housing.

The auxiliary cover member includes a cover opening for causing the first or second taking lens to appear externally on the photographic optical axis.

The auxiliary cover member is transparent and protects the first and second taking lenses.

According to another aspect of the invention, an assembling method of assembling a lens-fitted photo film unit includes the following steps. The outer sheet member is secured to the housing. After the outer sheet member is secured to the housing, the auxiliary cover member is secured to the housing.

At least a portion of the outer sheet member is disposed between the auxiliary cover member and the housing by the auxiliary cover member securing step.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
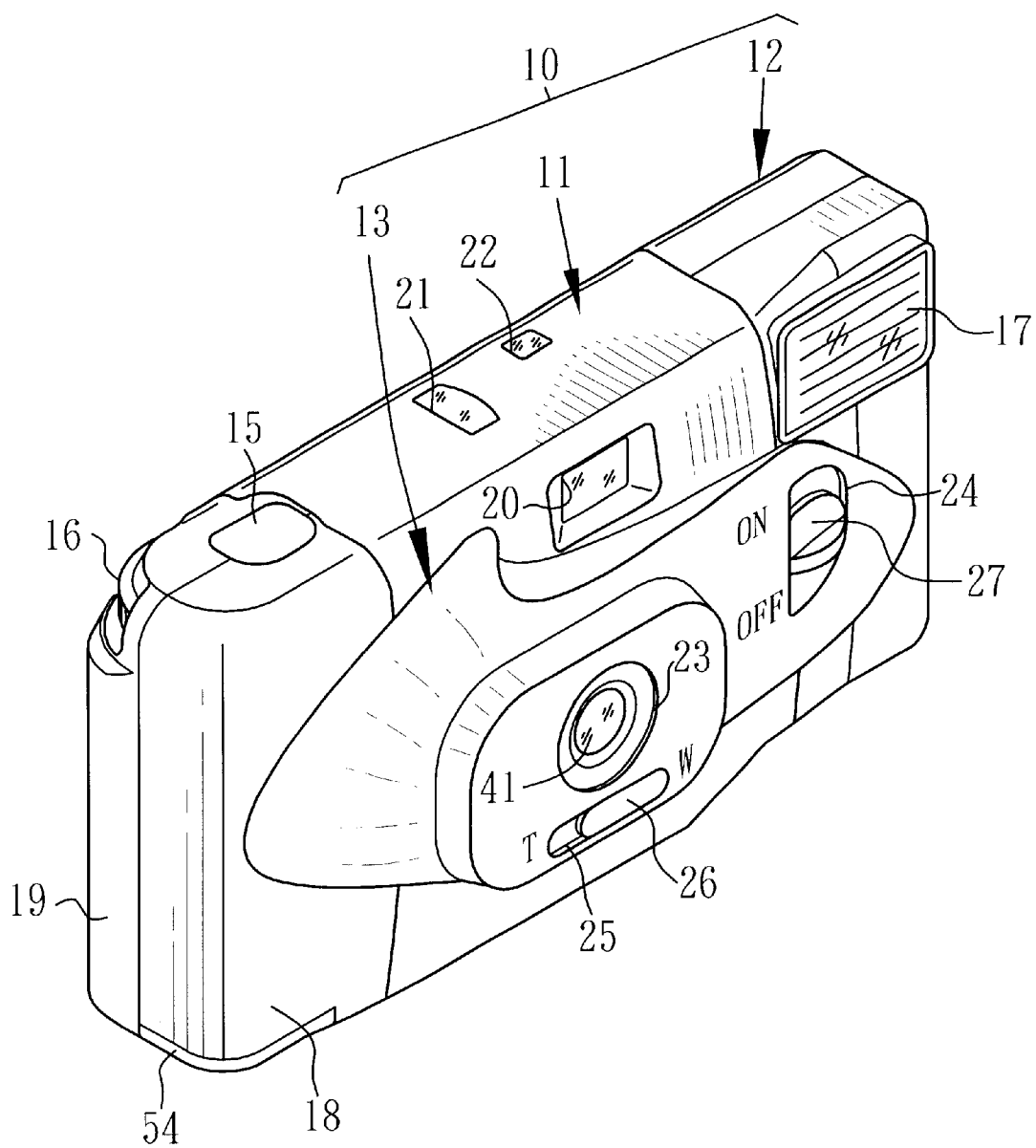
FIG. 1 is a perspective illustrating a lens-fitted photo film unit.

In FIG. 1, a lens-fitted photo film unit 10 is constituted by a housing 12, an outer sheet belt 11 and a auxiliary cover member 13. The housing 12 includes a front cover 18 and a rear cover 19, and between those, has a photo film cassette, shutter mechanism, lens changer mechanism, and viewfinder magnification changer mechanism. A shutter release button 15 is uncovered between upper edges of the front cover 18 and the rear cover 19. A winder wheel 16 appears in an opening formed in the rear cover 19. A flash emitter window 17 appears in an opening formed in the front cover 18. The front cover 18 and the rear cover 19 are respectively a plastic piece.

The outer sheet belt 11 has a shape of a strip as viewed in a developed state, and wound about the center of the housing 12 vertically. Letters, patterns and the like are printed on the outer sheet belt 11. Openings are formed in the outer sheet belt 11 for uncovering a viewfinder window 20, a frame counter window 21, a flash readiness indicator window 22 and the like. Information is printed on a rear portion of the outer sheet belt 11, and includes notice for handling, warning, and other information.

The auxiliary cover member 13 is formed from plastic material of a color the same as that of the front cover 18. There are a cover opening 23, a charger button opening 24 and a slot 25 formed in the auxiliary cover member 13. An externally operable button member 26 is slidably disposed inside the slot 25. The externally operable button member 26 is constituted by a button portion 28 and a button base portion 29. The button base portion 29 is slidably supported on a rear surface of the auxiliary cover member 13, and has a length enough to close the slot 25 even when the button base portion 29 is slid horizontally. The button portion 28 appears through the slot 25 and is externally operable.

On the outside of the auxiliary cover member 13, signs T and W are printed to indicate a telephoto mode and a wide-angle mode. A flash charger button 27 is provided with letters ON and OFF, which indicates turning on/off of the flash charger button 27.

Figure 2:
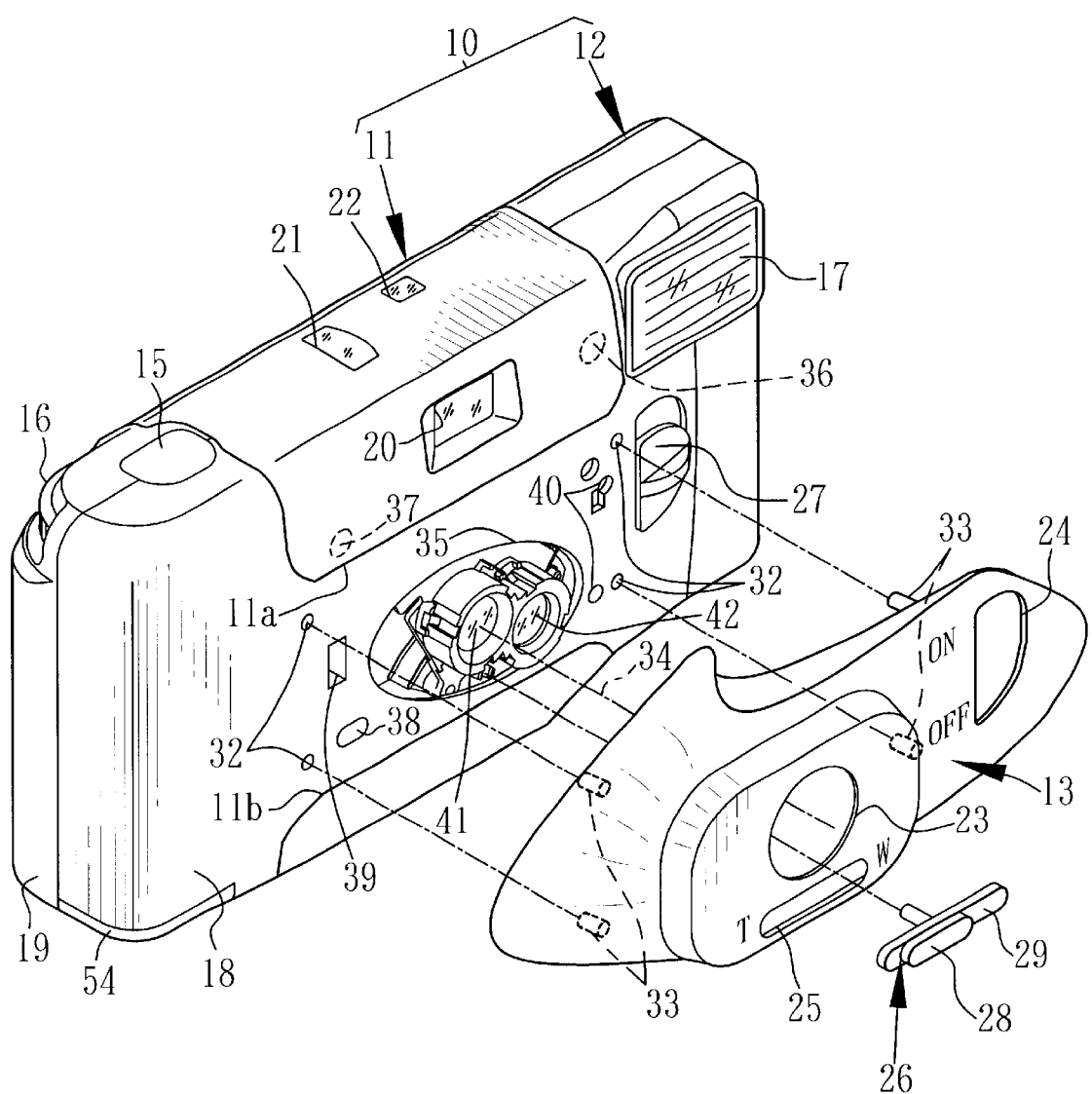
FIG. 2 is an exploded perspective illustrating a housing and a lens protector removed from the same.

FIG. 2 illustrate a state in which a wide-angle taking lens 41 appears behind the cover opening 23. At the same time, the button portion 28 is positioned at a right end of the slot 25. When the button portion 28 is slid to a left end of the slot 25, a telephoto taking lens 42 comes to appear behind the cover opening 23.

Plural positioning holes 32 are formed in the front cover 18. Plural positioning pins 33 are formed with the rear of the auxiliary cover member 13. The positioning pins 33 are fitted in respectively the positioning holes 32 to position the auxiliary cover member 13 on the front cover 18 suitably. The auxiliary cover member 13 is attached to the front cover 18 with adhesive agent that has adhesion strength as small as the auxiliary cover member 13 is peelable by external operation. It is to be noted that the auxiliary cover member 13 may be secured to the front cover 18 by use of engagement of hooks well-known in the art.

A central opening 35 is formed in the front cover 18 to surround a photographic optical axis 34. There are auxiliary openings 36, 37, 38, 39 and 40 which are formed in the front cover 18 and include such for flash inspection, such required for plastic molding, such required for molding the shapes of claws. The auxiliary openings 36–40 do not need to appear externally.

The outer sheet belt 11 is attached on the periphery of the housing 12 in such a wound shape that horizontal edges 11a and 11b of the outer sheet belt 11 are positioned above and below the central opening 35. Among the auxiliary openings 36–40, the auxiliary openings 36 and 37 are closed by the outer sheet belt 11, to prevent entry of external fluid or minute objects into the housing 12, such as water, sand, dust or the like.

The central opening 35 has a size enough to uncover the wide-angle taking lens 41 and the telephoto taking lens 42. The central opening 35 and the auxiliary openings 38–40 are covered and closed by the auxiliary cover member 13. Thus, entry of water, sand, dust or the like into the housing 12 can be avoided. Damages of the lens changer mechanism or the viewfinder magnification changer mechanism are prevented, as entry of external particles is avoided.

The auxiliary cover member 13 is attached to the front cover 18 after having attached the outer sheet belt 11 to the housing 12. The auxiliary cover member 13 covers the horizontal edges 11a and 11b of the outer sheet belt 11. One of the wide-angle taking lens 41 and the telephoto taking lens 42 set on the photographic optical axis 34 appears through the cover opening 23.

Figure 3:
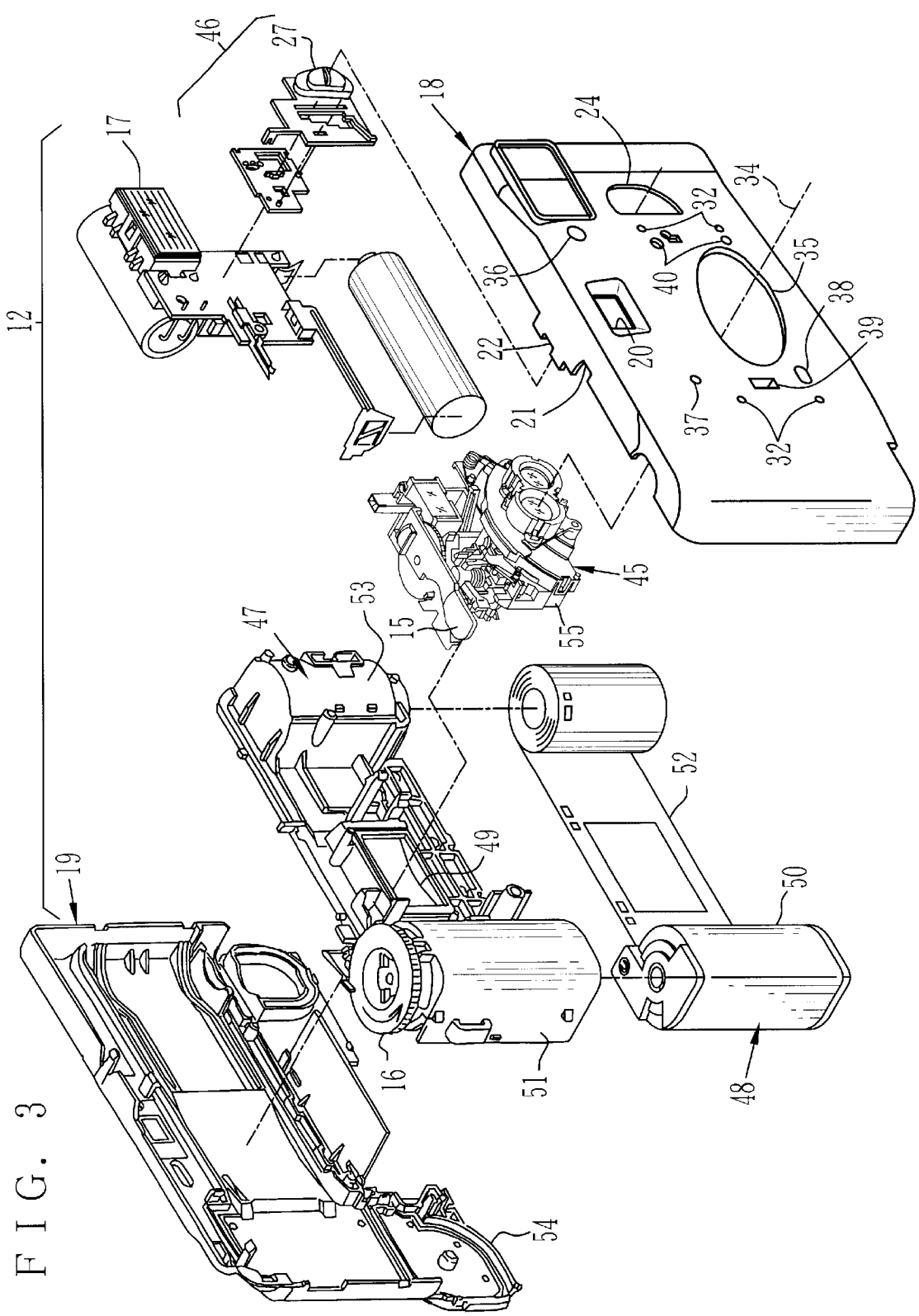
FIG. 3 is an exploded perspective illustrating the housing.

In FIG. 3, the housing 12 includes the front cover 18 and the rear cover 19 and also an exposure unit 45, an electronic flash unit 46, a main body 47 and a photo film cassette 48.

In the main body 47, there are formed an exposure aperture 49, a cassette holder chamber 51 and a roll holder chamber 53. The exposure aperture 49 lies between the cassette holder chamber 51 and the roll holder chamber 53. The cassette holder chamber 51 contains a cassette shell 50. The roll holder chamber 53 contains a roll of unexposed photo film 52 drawn from the cassette shell 50. The cassette holder chamber 51 and the roll holder chamber 53 are respectively open toward the rear, and are closed by the rear cover 19 after loading of the photo film cassette 48. The exposure unit 45 is secured to a front side of the exposure aperture 49 in a removable manner.

A lower lid 54 is a portion extended from the rear cover 19, and closes the underside of the cassette holder chamber 51. The lower lid 54 is opened before the cassette shell 50 containing the photo film 52 is removed. The winder wheel 16 is disposed on the top of the cassette holder chamber 51. After each exposure, the winder wheel 16 is rotated to wind the photo film 52 toward the inside of the cassette shell 50.

A base member 55 of the exposure unit 45 includes a light-shielded tunnel, and is provided with various elements including the shutter release button 15, a lens changer mechanism, release lock mechanism, viewfinder magnification changer mechanism, viewfinder optical system, shutter charge mechanism, shutter mechanism, frame counter mechanism, photo film one-frame advance mechanism, and the like. The light-shielded tunnel keeps a space light-tight between the exposure aperture 49 and the taking lens set at the photographic optical axis 34.

The shutter charge mechanism, shutter mechanism and photo film one-frame advance mechanism are constituted by a known combination of a sprocket wheel, a shutter drive lever, a retention lever, a shutter blade, and a spring. The sprocket wheel is meshed with perforations of the photo film 52, and rotated by movement of the photo film. The shutter drive lever is charged from an end position to a charged position by rotation of the sprocket wheel against the spring. Also, the retention lever is moved by rotation of the sprocket wheel to set the shutter drive lever in the charged position upon movement of the photo film 52 by one frame. When the retention lever is set in a position for keeping the shutter drive lever in the charged position, then the retention lever blocks rotation of the sprocket wheel and the winder wheel 16.

The shutter release button 15 has a cantilever structure, and is provided with a transmission rod projecting downwards. When the shutter release button 15 is depressed, the transmission rod is shifted to push a portion of the retention lever. Thus, the retention lever rotates from the retention position to the disengaged position, and discontinues retention of a shutter drive lever in a charged position. The shutter drive lever released from the retention is rotated by a spring instantaneously from the charged position to a released position, and knocks and swings the shutter blade. The shutter blade swings forwards and backwards to taken an exposure. Upon completion of rotation of the retention lever to the disengaged position, the sprocket wheel and the winder wheel 16 are allowed to rotate. The photo film becomes ready to be wound.

Figure 4:
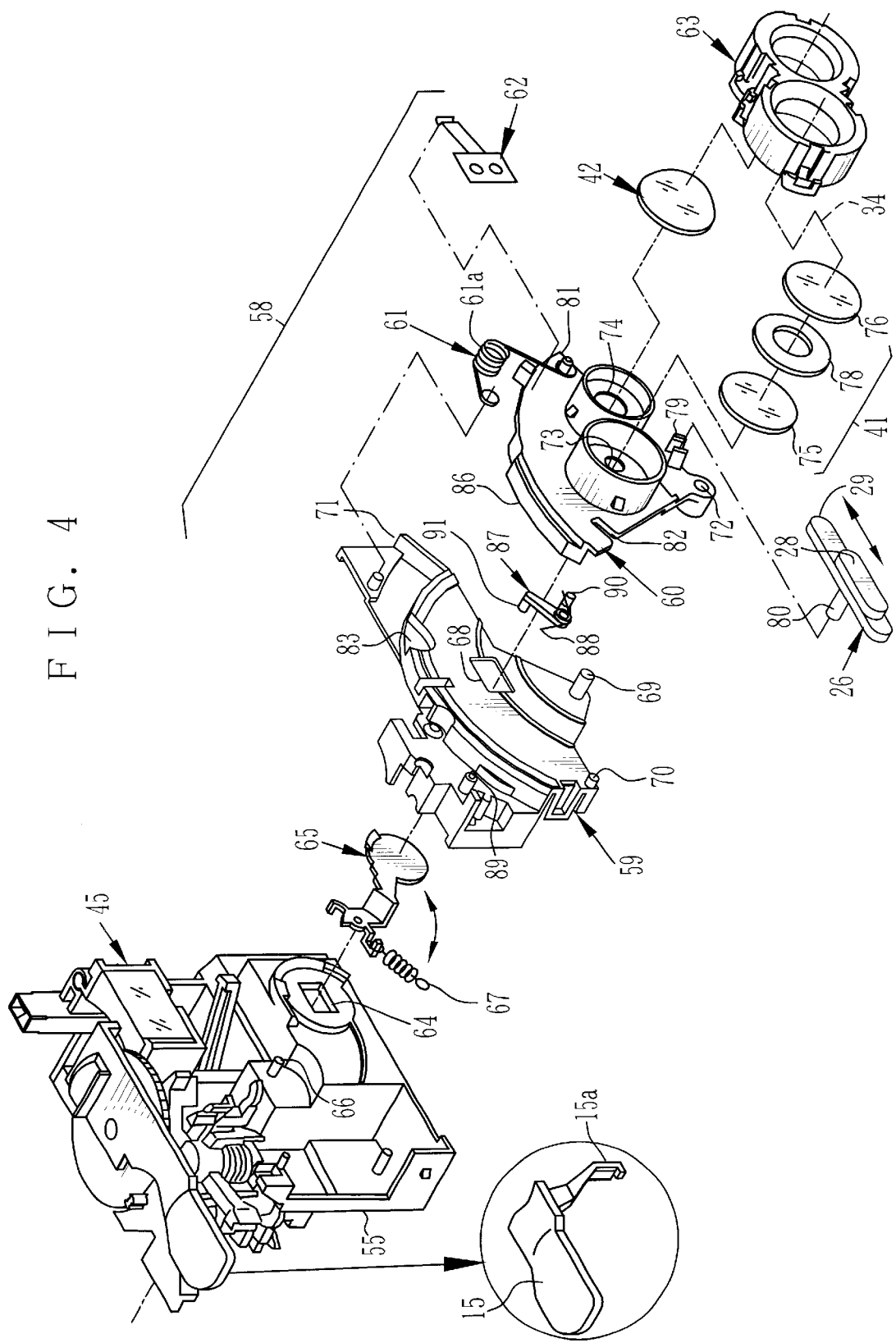
FIG. 4 is an exploded perspective illustrating a lens changer mechanism.

In FIG. 4, a lens changer mechanism 58 has elements including a shutter cover 59, a lens holder 60 in a sector shape, a first toggle spring 61, the wide-angle taking lens 41, the telephoto taking lens 42, a retention spring 62 and a lens cover 63.

A shutter opening 64 is formed in the front wall of the base member 55, is disposed on the photographic optical axis 34, and introduces light from a photographic field to the light-shielded tunnel. A shutter blade 65 is disposed in front of the shutter opening 64, and is pivotally movable about a pivot 66 projecting from the base member 55. The shutter blade 65 swings between a shut position and an open position disposed clockwise from the same. The shutter blade 65, when in the shut position, shuts the shutter opening 64, and when in the open position, opens the shutter opening 64. A spring 67 biases the shutter blade 65 toward the shut position.

The shutter cover 59 is disposed in front of the shutter blade 65 to keep a space enough for swinging of the shutter blade 65. The shutter cover 59 has an exposure opening 68, a pivot 69, a holder stopper pin 70 and a holder stopper wall 71. The exposure opening 68 is formed in the shutter cover 59 at the photographic optical axis 34 for introducing object light. The pivot 69 is disposed under the exposure opening 68. The holder stopper pin 70 is disposed in the left of the exposure opening 68. The holder stopper wall 71 is disposed in the right of the exposure opening 68.

The lens holder 60 is disposed in front of the shutter cover 59 by way of a support wall. A boss 72 is formed with the lens holder 60 at its axial portion with reference to the sector shape. The pivot 69 is inserted in a hole at the boss 72, so the sector-shaped portion of the lens holder 60 is rotatable in a path higher than the pivot 69. A first aperture 73 and a second aperture 74 are formed in the lens holder 60, operate by way of aperture stop, and are disposed so that their centers are equidistant from the axis through the boss 72. The wide-angle taking lens 41 is fitted on the front of the first aperture 73, and is constituted by a combination of two lens elements 75 and 76. The telephoto taking lens 42 is fitted on the front of the boss 72, and consists of a single lens element. The lens cover 63 in front of the taking lenses 41 and 42 is secured to the lens holder 60, and keeps those fixed in front of the lens holder 60. Note that a spacer 78 is inserted between the lens elements 75 and 76 in the wide-angle taking lens 41.

The telephoto taking lens 42 has a long back focus, and thus is in a position offset to the front from the wide-angle taking lens 41 along the photographic optical axis 34. Thus, the second aperture 74 is in a position offset to the front from the first aperture 73.

The wide-angle taking lens 41 has a focal length of 24 mm, and an f-number of 11. A range of a subject distance of a subject photographable with the wide-angle taking lens 41 in consideration of the depth of field is from 1.2 meters to infinity. The telephoto taking lens 42 has a focal length of 35 mm, and an f-number of 11. A range of a subject distance of a subject photographable with the telephoto taking lens 42 in consideration of the depth of field is from 1.5 meters to infinity. Note that the taking lenses 41 and 42 may have specifics different from those examples.

A fork 79 is formed with the lens holder 60 between the boss 72 and the photographic optical axis 34. A projection 80 projects from the button portion 28 of the externally operable button member 26 to the rear. The fork 79 has two plate portions opposed to one another, and receives the projection 80. The projection 80 has a play in a direction perpendicular to the photographic optical axis 34, and engaged with the fork 79 in the rotational direction of the lens holder 60.

The lens holder 60, when the button base portion 29 is slid to the right, rotates to a wide-angle position, and when the button base portion 29 is slid to the left, rotates to a telephoto position. When the lens holder 60 is in the wide-angle position, a holder edge 81 of the lens holder 60 is contacted by the holder stopper wall 71 to position the wide-angle taking lens 41 on the photographic optical axis 34. When the lens holder 60 is in the telephoto position, a cutout 82 formed in the left of the lens holder 60 is contacted by the holder stopper pin 70 to position the telephoto taking lens 42 on the photographic optical axis 34. A regulation mechanism of the present invention is constituted by a combination of the holder stopper pin 70, the cutout 82, the holder edge 81 and the holder stopper wall 71.

The externally operable button member 26 is connected with the lens holder 60 in a position near to the boss 72 about which the lens holder 60 rotates. This connecting position is effective in shortening the moving stroke of the externally operable button member 26. The slot 25 can have a small length to prevent lowering of the strength of the front cover 18.

A portion for closing a gap between the externally operable button member 26 and the slot 25 can have a smaller length. Thus, the button base portion 29 can have a smaller length in its sliding direction. The lens-fitted photo film unit 10 can have a reduced size because of a small space in which the externally operable button member 26 is movable.

The first toggle spring 61 is disposed in a position opposite to the rotational orbit of the shutter blade 65 with reference to the photographic optical axis 34. A spring coil portion 61a is included in the first toggle spring 61. A recess 83 is formed in the shutter cover 59 for maintaining the space for receiving the spring coil portion 61a. The recess 83 is disposed in a rotational orbit of the lens holder 60 as viewed from the front.

The first toggle spring 61 has one end secured to the shutter cover 59 and a remaining end secured to the lens holder 60. There is a dead point of the lens holder 60 between the wide-angle position and the telephoto position. When the lens holder 60 is rotated beyond the dead point, the first toggle spring 61 biases the lens holder 60 to the wide-angle position or the telephoto position. When the lens holder 60 is in the wide-angle position, the spring coil portion 61a is outside the rotational orbit of the lens holder 60. When the lens holder 60 is in the telephoto position, the spring coil portion 61a is entered in the recess 83.

The retention spring 62 is a spring plate of metal, and has one end secured to the rear of the auxiliary cover member 13, and a remaining end for biasing the lens holder 60 toward the shutter cover 59. The use of metal as material of the retention spring 62 is effective in a stable resilient characteristic even with changes of temperature. If the front cover 18 is molded from plastic material, the retention spring 62 receives little influence even when the auxiliary cover member 13 is deformed with heat. Therefore, the retention spring 62 can exert stable force to push the lens holder 60.

The position of biasing of the retention spring 62 is defined at an upper arc-shaped edge of the lens holder 60 away from the rotational center. This is effective in keeping the bias stable even while the lens holder 60 rotates. Note that a retention spring may be secured to the lens holder 60, and may have a portion in contact with a rear of the auxiliary cover member or the front cover to bias the lens holder 60 to the shutter cover 59.

The release lock mechanism or retention mechanism has elements including a cam portion 86, a lock lever 87 and a torsion coil spring 88. The cam portion 86 projects from the upper arc-shaped edge of the lens holder 60. The lock lever 87 has a V shape. A pivot 89 projects from the shutter cover 59, and supports a boss of the lock lever 87 in a rotatable manner. A cam follower end 90 of the lock lever 87 is directed toward the cam portion 86. A lock end 91 of the lock lever 87 is directed toward a transmission rod 15a.

The cam portion 86 is constituted by first and second cam elements, and rotates the lock lever 87 between a locked position and an unlocked position. The lock lever 87, when in the locked position, shifts the lock end 91 into a shifting orbit of the transmission rod 15a, and when in the unlocked position, shifts the lock end 91 out of the shifting orbit of the transmission rod 15a. The first cam element keeps the lock lever 87 in the locked position while the lens holder 60 rotates in positions except for the wide-angle or telephoto position. The second cam element rotates the lock lever 87 to the unlocked position when the lens holder 60 is in the wide-angle or telephoto position. When the lock lever 87 is rotated to the locked position, the lock end 91 comes into the shifting orbit of the transmission rod 15a to lock the shutter device. The torsion coil spring 88 biases the lock lever 87 in a direction for the cam follower end 90 to contact the cam portion 86.

Figure 5:
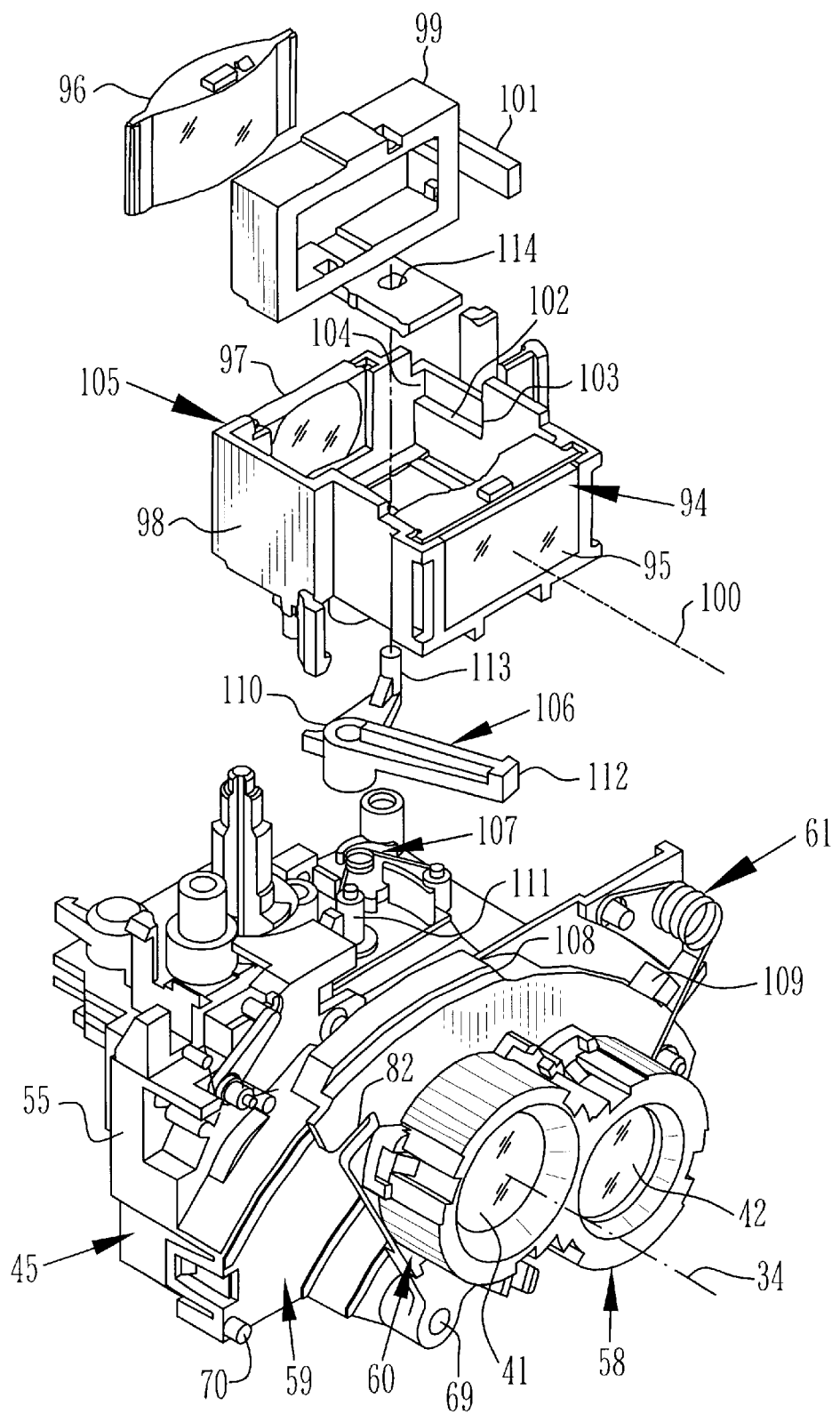
FIG. 5 is an exploded perspective illustrating a magnification changer mechanism for the viewfinder.

In FIG. 5, a viewfinder optical system 94 is depicted, and includes an objective lens 95, a movable lens 96, and an eyepiece lens 97 in an order toward the rear. A stationary holder 98 supports the objective lens 95 and the eyepiece lens 97 fixedly. The stationary holder 98 is secured to the base member 55 in a removable manner.

A movable holder 99 supports the movable lens 96. A sliding rod 101 extends in the movable holder 99 in parallel with a viewfinder optical axis 100. A rail 102 is formed with the stationary holder 98 to guide the sliding rod 101 in a direction of the viewfinder optical axis 100.

Lens stopper walls 103 and 104 are formed at ends of the rail 102 to constitute a lens regulation mechanism. A front end 101b of the sliding rod 101 comes in contact with the lens stopper wall 103 and positions the movable lens 96 in a telephoto lens position close to the objective lens 95. For the front end 101b, see FIG. 9B. A rear end 101a of the sliding rod 101 comes in contact with the lens stopper wall 104 and positions the movable lens 96 in a wide-angle lens position close to the eyepiece lens 97. For the rear end 110a, see FIG. 9A. When the movable lens 96 is in the telephoto lens position, the viewfinder optical system 94 is set at a magnification corresponding to the telephoto taking lens 42. When the movable lens 96 is in the wide-angle lens position, the viewfinder optical system 94 is set at a magnification corresponding to the wide-angle taking lens 41.

A magnification changer mechanism 105 includes the sliding rod 101, the lens stopper walls 103 and 104, and also a transmission lever 106, a second toggle spring 107 and a pair of driving portions 108 and 109. The driving portions 108 and 109 are disposed at an upper arc-shaped edge of the lens holder 60 and arranged at a predetermined interval in the rotational direction. The transmission lever 106 has the V shape. A boss 110 of the transmission lever 106 is supported in a manner rotatable about a pivot 111 on the upside of the base member 55. The transmission lever 106 has a driven end 112 directed toward a position between the driving portions 108 and 109, and a driving pin 113 engaged with an engaging hole 114 formed in the movable holder 99.

When the lens holder 60 rotates from the wide-angle position toward the telephoto position, the driven end 112 of the transmission lever 106 is pushed by the driving portion 109 to make a clockwise rotation about the pivot 111. The driving pin 113 of the driving portion 109 moves the movable lens 96 to the telephoto lens position. In contrast, when the lens holder 60 rotates from the telephoto position toward the wide-angle position, the driven end 112 of the transmission lever 106 is pushed by the driving portion 108 to make a counterclockwise rotation about the pivot 111. The driving pin 113 of the driving portion 109 moves the movable lens 96 to the wide-angle lens position.

In the present embodiment, the rotational center of the lens holder 60 is disposed under the photographic optical axis 34. Thus, the space at the upper arc-shaped edge of the lens holder 60 is utilized for linking with the magnification changer mechanism 105, which can have a reduced size. Furthermore, the upper arc-shaped edge of the lens holder 60 has long moving stroke because the most distant from the rotational center. The long moving stroke can be transmitted to the magnification changer mechanism 105. Thus, the movable lens 96 can be moved long. A range of changing the magnification in the magnification changer mechanism 105 can be large.

The second toggle spring 107 has one end engaged with the transmission lever 106 and a remaining end engaged with the base member 55. When the transmission lever 106 is rotated to the dead point defined in the middle of rotating range of the transmission lever 106, the second toggle spring 107 biases the transmission lever 106 in directions to move the movable lens 96 toward the telephoto and wide-angle lens positions. When the lens holder 60 is set in the telephoto or wide-angle position, the driven end 112 and the driving portions 108 and 109 come to have positions to create a gap between those. Upon completion of actuation of the lens changer mechanism 58, linking with the magnification changer mechanism 105 is undone. Thus, the lens changer mechanism 58 and the magnification changer mechanism 105 can be kept respectively positioned exactly by the bias of the first and second toggle springs 61 and 107.

Figure 6:
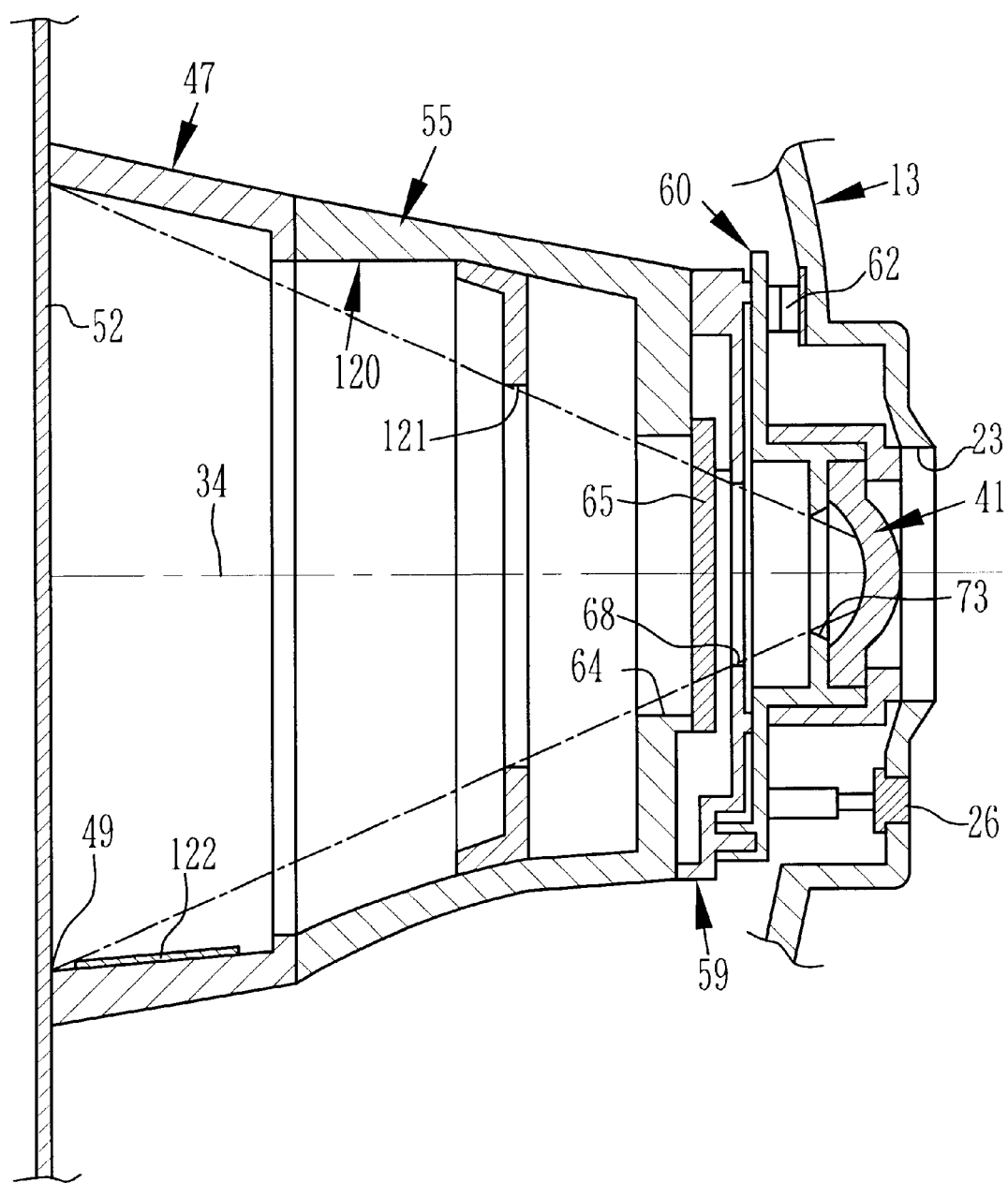
FIG. 6 is a section illustrating a light-shielded tunnel in a telephoto state.
Figure 7:
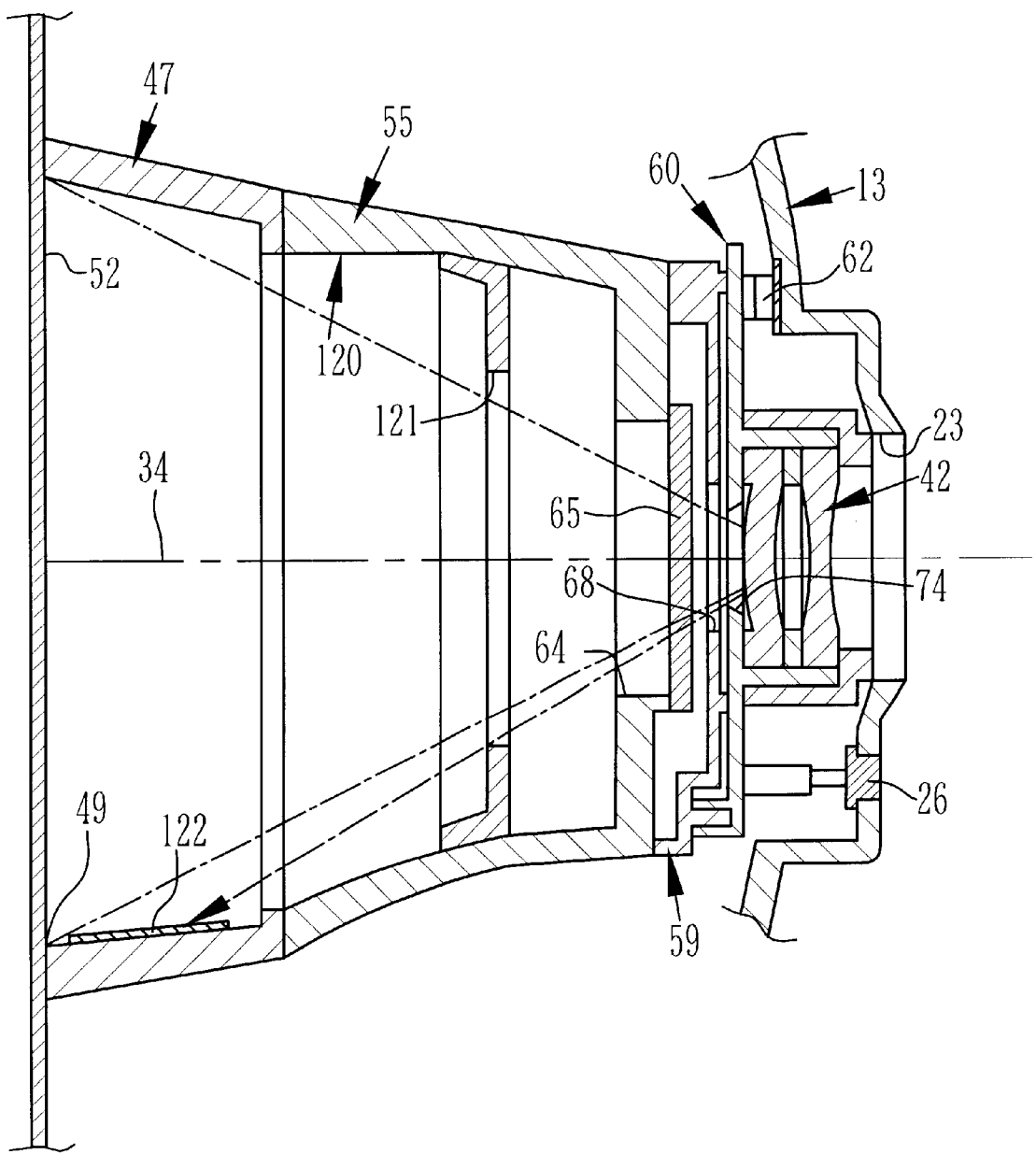
FIG. 7 is a section illustrating the light-shielded tunnel in a wide-angle state.

In FIGS. 6 and 7, a light-shielded tunnel 120 is included in the base member 55. A light restricting aperture 121 for an anti-flare purpose is formed inside the light-shielded tunnel 120. An anti-reflection member 122 is attached to the downside of the front of the exposure aperture 49. An example of the anti-reflection member 122 is pile paper of black color and the like. In the present embodiment, the inner size of the light-shielded tunnel 120 is determined in consideration of flux of light effective in the telephotography.

The second aperture 74 for telephotography is disposed nearer to the photo film surface than the first aperture 73 for wide-angle photography. Flux of light effective in exposure has a greater width in the telephotography than in the wide-angle photography. Thus, the anti-reflection member 122 operates to prevent occurrence of flare or ghost image due to unwanted scattered light at the time of the telephotography, the unwanted light being scattered by reflection inside the light-shielded tunnel 120 toward the photo film and not directed to the exposure aperture 49 after passage in the light restricting aperture 121.

The operation of the above construction is described now. To assemble the lens-fitted photo film unit 10, the housing 12 is transferred to a station for a process of attaching the outer sheet belt 11.

In the attaching process, the outer sheet belt 11 is attached to the center of the housing 12. The lens-fitted photo film unit 10 with the outer sheet belt 11 is conveyed to a protector securing process for the auxiliary cover member 13.

In the protector securing process, the auxiliary cover member 13 is positioned by means of the positioning pins 33 and the positioning holes 32, and is attached with adhesive agent to the housing 12. The lens-fitted photo film unit 10 completed after securing the auxiliary cover member 13 is transferred to a packaging process, and is made ready for shipment.

The outer sheet belt 11 is attached to the housing 12 before attachment of the auxiliary cover member 13 in a manner irrespective of the shape of the auxiliary cover member 13. It is possible to design the shape of the auxiliary cover member 13 in a free manner without limitation to a curved surface formable by curving a plane surface. Accordingly, a front side of the lens-fitted photo film unit 10 can be shaped freely without consideration of the outer sheet belt 11. Also, the lens-fitted photo film unit 10 can have a compact shape.

Figure 8A:
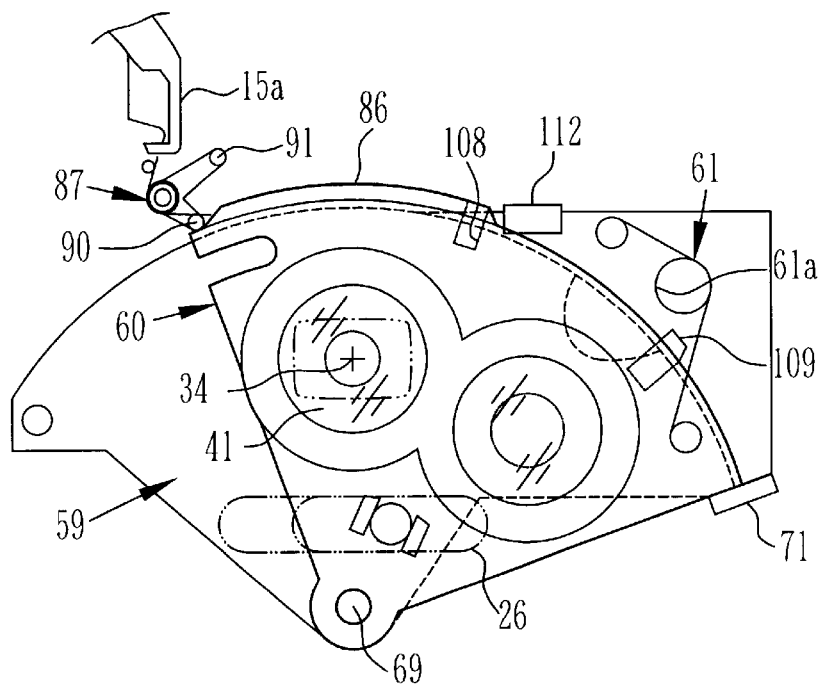
FIG. 8A is an explanatory view illustrating a lens changer mechanism in the wide-angle state.

The lens-fitted photo film unit 10 is shipped and sold in the state set in the wide-angle photography. The externally operable button member 26 is set at the sign W. In FIG. 8A, the lens holder 60 is in the wide-angle position with the holder edge 81 contacting the holder stopper wall 71. As the lens holder 60 is biased by the first toggle spring 61 to contact the holder stopper wall 71, the wide-angle taking lens 41 is positioned at the photographic optical axis 34.

Figure 9A:
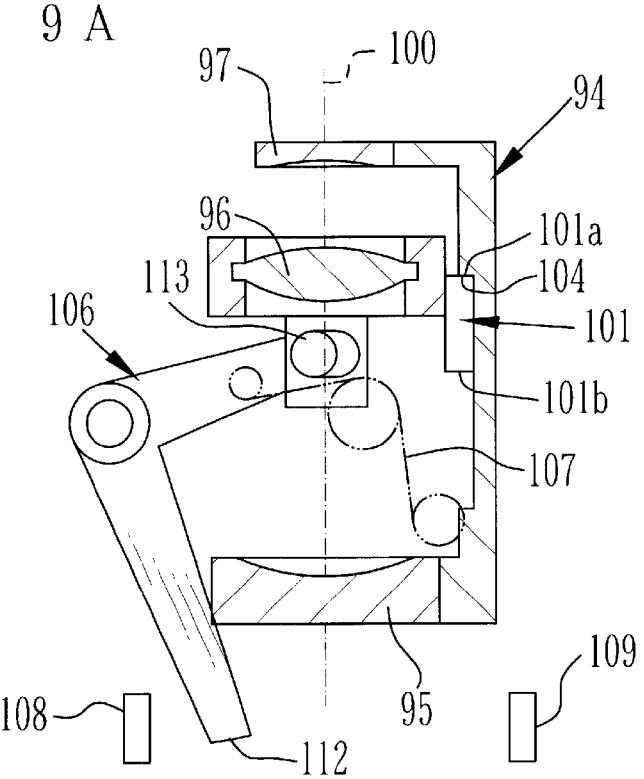
FIG. 9A is an explanatory view illustrating the magnification changer mechanism in a wide-angle lens position.

In FIG. 9A, the viewfinder optical system 94 is illustrated. The transmission lever 106 is biased in a direction for the second toggle spring 107 to cause the rear end 110a of the sliding rod 101 to contact the lens stopper wall 104. Thus, the movable lens 96 is set exactly in the wide-angle lens position. Thus, the driven end 112 of the transmission lever 106 is disposed with a prescribed distance from the driving portion 108, to undo the linking between the lens changer mechanism 58 and the magnification changer mechanism 105. There occurs no interference due to biasing force of the first and second toggle springs 61 and 107. The movable lens 96 and the wide-angle taking lens 41 can be positioned correctly by the lens changer mechanism 58 and the magnification changer mechanism 105.

When the lens holder 60 is in the wide-angle position, the lock end 91 of the lock lever 87 is away from the shifting orbit of the transmission rod 15a. The shutter releasing operation is allowed. Then the shutter release button 15 is depressed to take an exposure. The viewfinder optical system 94 is set at the magnification determined according to that of the wide-angle taking lens 41, so it is easy to frame the photographic field.

Figure 8B:
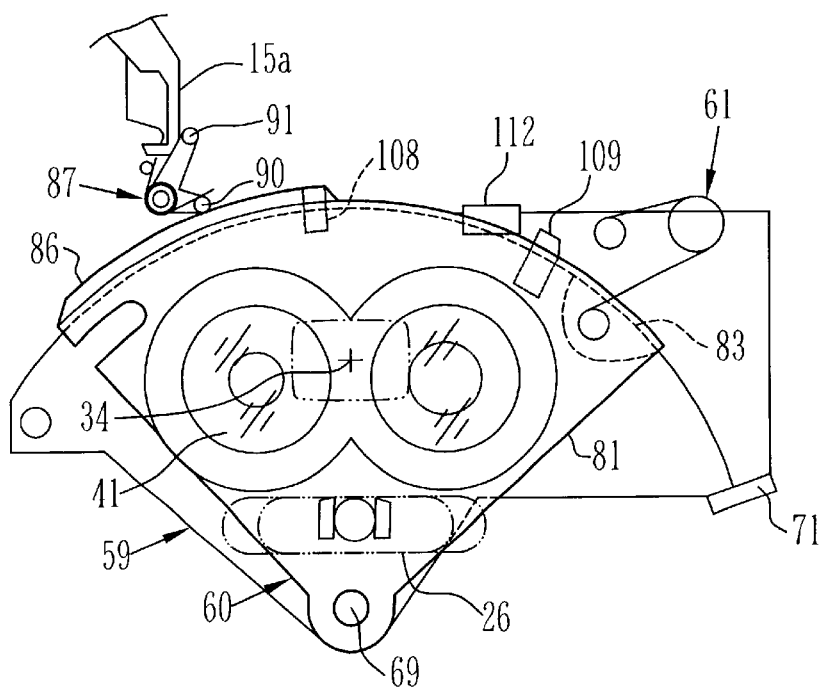
FIG. 8B is an explanatory view illustrating the lens changer mechanism in a state between wide-angle and telephoto lens positions.
Figure 8C:
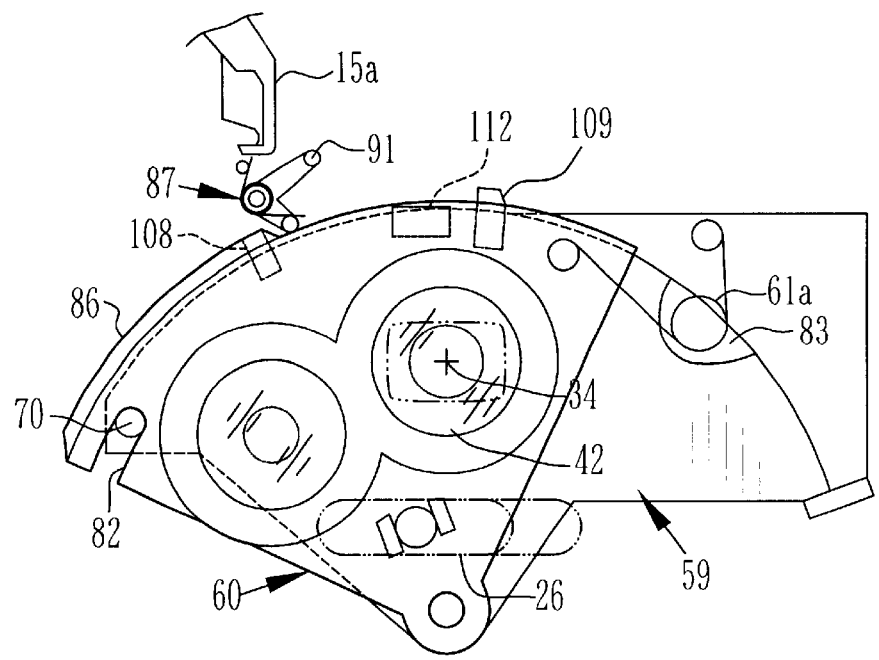
FIG. 8C is an explanatory view illustrating the lens changer mechanism in the telephoto state.

To take a photograph in the telephotography, the externally operable button member 26 is set at the sign T. As illustrated in FIG. 8B, the lens holder 60 makes a counterclockwise rotation against the first toggle spring 61. During rotation of the lens holder 60, the biasing force of the first toggle spring 61 becomes exerted in a direction to help the counterclockwise rotation upon reach to an intermediate rotational position of the lens holder 60. In FIG. 8C, the spring coil portion 61a of the first toggle spring 61 moves into a rotational orbit of the lens holder 60. The holder stopper pin 70 becomes engaged with the cutout 82 to keep the lens holder 60 from rotating in the counterclockwise direction. The spring coil portion 61a comes into the recess 83. The telephoto taking lens 42 is set on the photographic optical axis 34.

While the lens holder 60 makes a counterclockwise rotation, the cam portion 86 pushes up the cam follower end 90, to rotate the lock lever 87 to the lock position. The lock end 91 of the lock lever 87 comes into the shifting orbit of the transmission rod 15a and prevents the transmission rod 15a from shifting. If the shutter release button 15 is depressed inadvertently while the externally operable button member 26 is slid, no exposure is taken.

When the lens holder 60 is set in the telephoto position, the cam portion 86 rotates the lock lever 87 to the unlocked position. In response to this, the lock end 91 of the lock lever 87 comes out of the shifting orbit of the transmission rod 15a. Thus, the shutter device is made ready to be released.

In the present embodiment, the first toggle spring 61 is disposed opposite to a swinging orbit of the shutter blade 65 with reference to the photographic optical axis 34. Accordingly, the first toggle spring 61 can be disposed close to the photographic optical axis 34. The lens changer mechanism 58 can be constructed compactly.

For the disposition of the first toggle spring 61, it is necessary to consider a moving space for the spring coil portion 61a. In the present embodiment, the shutter cover 59 is provided with the recess 83 for entry of the spring coil portion 61a upon rotation of the lens holder 60 to the telephoto position. Thus, the space for moving the first toggle spring 61 can be reduced. The size of the whole can be the smaller.

While the lens holder 60 makes a counterclockwise rotation, the driving portion 109 moves beyond a position of a predetermined distance. In response to this, the driving portion 109 comes to contact the driven end 112 of the transmission lever 106, and biases the driven end 112 toward the left as illustrated in FIG. 9A. Thus, the transmission lever 106 makes a clockwise rotation against the second toggle spring 107. In the middle of the rotation of the transmission lever 106, the force of the second toggle spring 107 becomes effective to help this clockwise rotation.

Figure 9B:
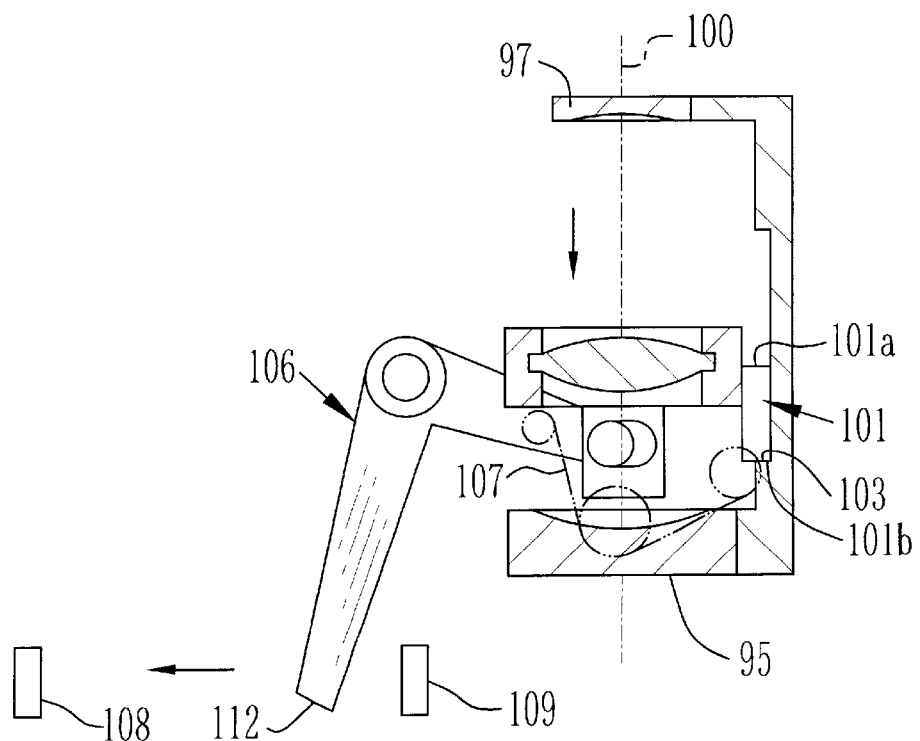
FIG. 9B is an explanatory view illustrating the magnification changer mechanism in a telephoto lens position.
Figure 11:
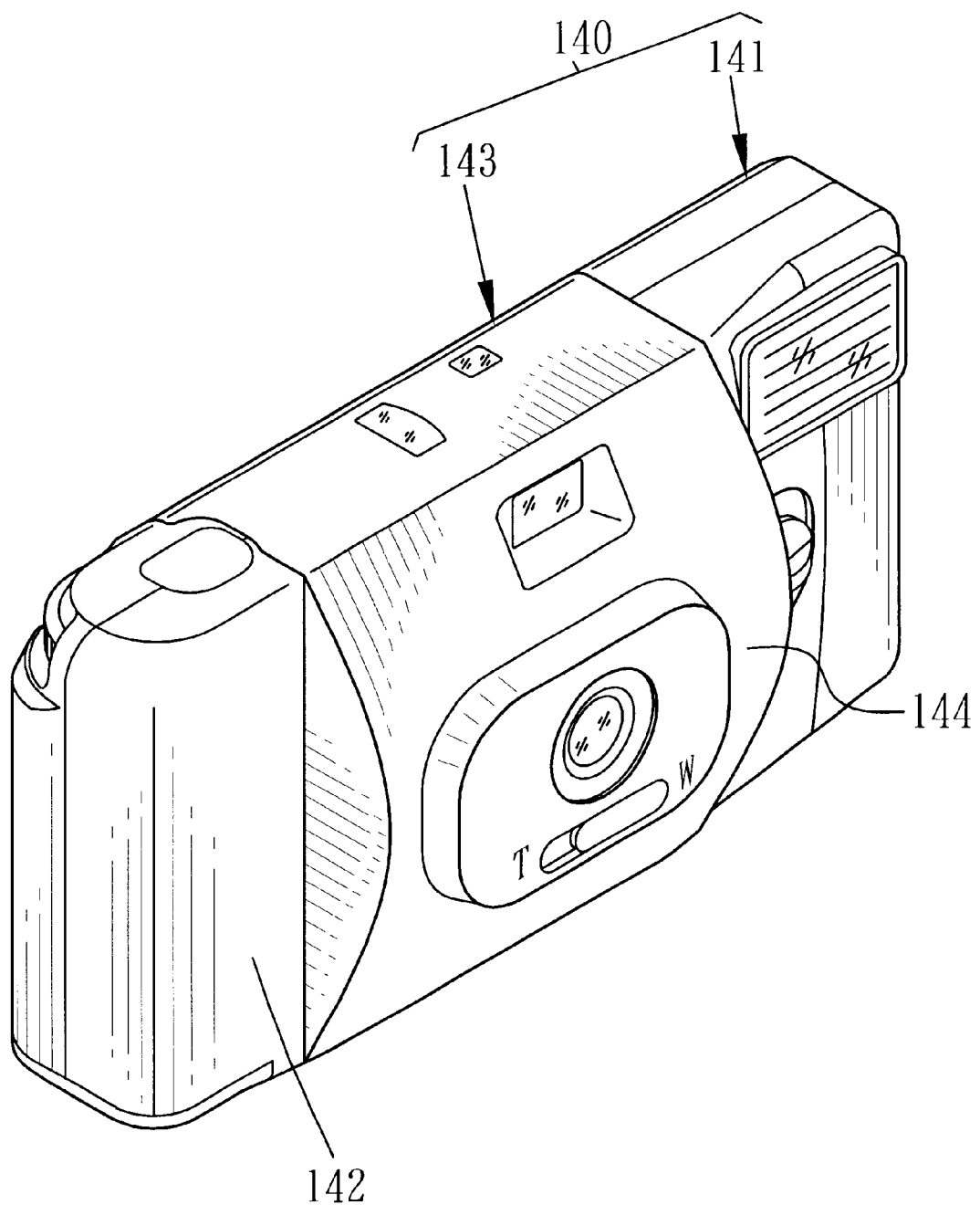
FIG. 11 is a perspective illustrating a lens-fitted photo film unit according to the prior art.

In FIG. 9B, the front end 101b of the sliding rod 101 comes in contact with the lens stopper wall 103 to stop the transmission lever 106 from rotating clockwise. The driven end 112 of the transmission lever 106 comes away from the driving portion 109 by a predetermined distance. Thus, the linking of the lens changer mechanism 58 and the magnification changer mechanism 105 is undone. The movable lens 96 is set in the telephoto lens position. The viewfinder optical system 94 is changed over to a magnification set according to the photographing magnification of the telephoto taking lens 42. A viewfinder field frame can be observed in a manner according to the angle of view of the telephoto taking lens 42. The photographic field can be framed because of easy observation of the object image.

After the field is framed, the shutter release button 15 is depressed. Then the shutter blade 65 is swung to take an exposure. If flash emission is desired, the flash charger button 27 is slid to the position of ON before an exposure is taken.

When all frames are exposed, the lens-fitted photo film unit 10 is forwarded to a photofinishing agent, to which the user places an order for development. A great number of lens-fitted photo film units after exposures are collected and brought to a photo laboratory. The lower lid 54 is opened, to remove the cassette shell 50 with the photo film 52 after exposures. Furthermore in the photo laboratory, the photo film 52 is removed from the cassette shell 50, and subjected to processing and printing. Prints are produced, and supplied by the photofinisher to the user. In turn, the lens-fitted photo film unit 10 from which the photo film 52 is removed is withdrawn from the photo laboratory to a factory, where the lens-fitted photo film unit 10 is subjected to a disassembling process for the purpose of recycling.

In a disassembling process of the lens-fitted photo film unit 10, at first the auxiliary cover member 13 is removed from the housing 12. As the externally operable button member 26 remains with the auxiliary cover member 13, the externally operable button member 26 can be removed from the housing 12 by removal of the auxiliary cover member 13. The outer sheet belt 11 is removed next. The housing 12 is washed to eliminate unwanted deposits, transferred to a disassembling station, where parts are disassembled.

The parts reusable without changes are supplied to a manufacturing process, and incorporated in a new product. The parts of resin with damages or deformation are pelletized, remelted and utilized as raw material.

In the above embodiment, the auxiliary cover member 13 is formed from the resin of the same color as the front cover 18. However, the auxiliary cover member 13 may be formed from a transparent resin. The cover opening 23 can be closed by the transparent plate and can have a window shape, through which entry of water, sand, dust or the like can be avoided. Note that the auxiliary openings 36–40 are open in the housing 12 and do not need to be uncovered externally. If the auxiliary cover member 13 is transparent, the auxiliary openings 36–40 are seen externally. For this transparency, it is preferable to finish all portions except for the portion in front of the cover opening 23 with translucency, for example by forming a great number of minute recesses/projections according to mat finish.

Furthermore, either one or both of the auxiliary cover member 13 and the externally operable button member 26 may be formed from opaque resin with a color different from that of the front cover 18. In assembling the housing 12, removal of the auxiliary cover member 13 also removes the externally operable button member 26 from the front cover 18. Therefore, no mixture in the color of resin occurs at the time of remelting the front cover 18 for recycling. The front cover 18 can be formed with high quality.

Note that the taking lenses 41 and 42 are respectively caused to appear in the central opening 35. It is also possible in the central opening 35 to cause only one lens with a greater length to appear. In the above embodiment, the externally operable button member 26 is disposed in the auxiliary cover member 13 as externally operable member. However, the externally operable button member 26 may be provided in the housing 12.

Figure 10:
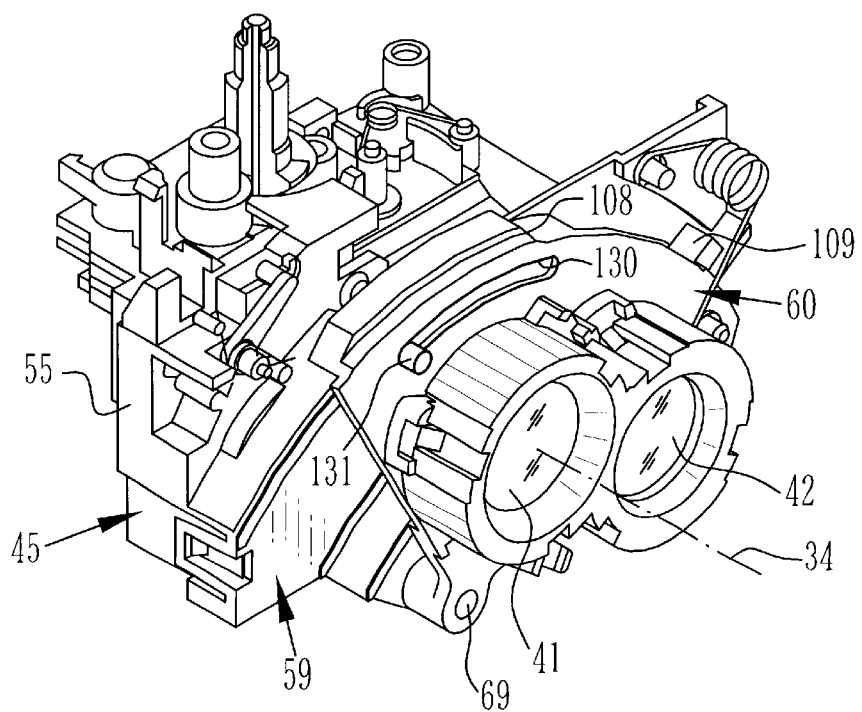
FIG. 10 is a perspective illustrating another preferred magnification changer mechanism.

In the above embodiment, the regulation mechanism is constituted by the right end of the lens holder 60, the holder stopper wall 71, the cutout 82 and the holder stopper pin 70. In FIG. 10, another preferred regulation mechanism is depicted, which includes a holder stopper slot 130 and a stopper pin 131. The holder stopper slot 130 is formed in the lens holder 60. The stopper pin 131 is inserted in the holder stopper slot 130. The stopper pin 131 projects from the shutter cover 59. The holder stopper slot 130 is formed in an upper portion of the lens holder 60, extends in an arc shape defined about the rotational center of the lens holder 60. The length of the holder stopper slot 130 corresponds to a rotating section of the lens holder 60. A left end of the holder stopper slot 130 contacts the stopper pin 131 and sets the lens holder 60 in the wide-angle position. A right end of the holder stopper slot 130 contacts the stopper pin 131 and sets the lens holder 60 in the telephoto position.

Also, it is possible instead of the holder stopper slot 130 to form a stopper recess in an upper edge of the lens holder 60 in a manner open upwards.

Furthermore, it is possible in the present invention to incorporate the magnification changer mechanism 105 in a compact camera, a pocket camera or any suitable optical instruments.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit pre-loaded with photo film, comprising:

first and second taking lenses having focal lengths different from each other;

a movable lens holder for supporting said first and second taking lenses on a plane crosswise to a photographic optical axis;

an externally operable member for moving said lens holder to first and second positions, to set said first and second taking lenses on said photographic optical axis respectively when said lens holder is in said first and second positions;

a viewfinder optical system, settable at first and second viewfinder magnifications, and adapted to observation of a photographic field; and a magnification changer mechanism for setting said viewfinder optical system at said first and second viewfinder magnifications respectively when said first and second taking lenses are set on said photographic optical axis;

wherein said lens holder is rotatable about a rotational center, said first and second taking lenses are so disposed as to lie on a circle defined about said rotational center;

said externally operable member is disposed between said rotational center and said first and second taking lenses.

2. A lens-fitted photo film unit as defined in claim 1, wherein said viewfinder optical system includes an objective lens, an eyepiece lens and a movable lens disposed therebetween;

said magnification changer mechanism moves said movable lens along a viewfinder optical axis upon actuation of said lens holder.

3. A lens-fitted photo film unit as defined in claim 1, wherein said rotational center is disposed under said photographic optical axis, and said viewfinder optical axis is disposed above said taking lenses.

4. A lens-fitted photo film unit as defined in claim 2, further comprising:

a front cover for covering a front of said lens holder;

a slot formed in said front cover;

wherein said externally operable member is connected with said lens holder through said slot.

5. A lens-fitted photo film unit as defined in claim 4, further comprising a holder regulation mechanism for positioning said lens holder in said first and second positions.

6. A lens-fitted photo film unit as defined in claim 5, further comprising:

a shutter mechanism, actuated upon a releasing operation, for providing an exposure in said photo film; and a lock mechanism for allowing said releasing operation if said lens holder is in said first or second position, and for inhibiting said releasing operation if said lens holder is between said first and second positions.

7. A lens-fitted photo film unit as defined in claim 6, wherein said slot extends substantially straight.

8. A lens-fitted photo film unit as defined in claim 6, wherein said holder regulation mechanism includes:

a first toggle spring, having one end secured to said lens holder, for biasing said lens holder toward said first and second positions respectively when said lens holder is offset from a dead point toward said first and second positions;

a stopper for preventing said lens holder from moving out of an orbit between said first and second positions.

9. A lens-fitted photo film unit as defined in claim 8, wherein said stopper includes first and second stopper members, disposed on sides of a rotational orbit of said lens holder, for contacting said lens holder.

10. A lens-fitted photo film unit as defined in claim 8, further comprising first and second apertures, formed in said lens holder behind respectively said first and second taking lenses, said first aperture being positioned at a level in front of a level of said second aperture.

11. A lens-fitted photo film unit as defined in claim 10, further comprising:

a light-shielded tunnel, disposed between said lens holder and said photo film, for shielding ambient light from a light path defined along said photographic optical axis;

a light restricting aperture, disposed in said light-shielded tunnel, and having a size associated with effective flux for exposure through said first taking lens;

an anti-reflection member, disposed on an inner face of said light-shielded tunnel and between said light restricting aperture and said photo film, for absorbing unwanted light having passed said second taking lens and an edge portion of said light restricting aperture while said shutter mechanism is open.

12. A lens-fitted photo film unit as defined in claim 8, wherein said magnification changer mechanism sets said movable lens in first and second lens positions on said viewfinder optical axis respectively when said lens holder is in said first and second positions to set said viewfinder optical system at respectively said first and second viewfinder magnifications.

13. A lens-fitted photo film unit pre-loaded with photo film, comprising:

first and second taking lenses having focal lengths different from each other;

a movable lens holder for supporting said first and second taking lenses on a plane crosswise to a photographic optical axis, wherein said lens holder is rotatable about a rotational center, said first and second taking lenses are so disposed as to lie on a circle defined about said rotational center;

an externally operable member for moving said lens holder to first and second positions, to set said first and second taking lenses on said photographic optical axis respectively when said lens holder is in said first and second positions;

a viewfinder optical system, settable at first and second viewfinder magnifications, and adapted to observation of a photographic field;

a magnification changer mechanism for setting said viewfinder optical system at said first and second viewfinder magnifications respectively when said first and second taking lenses are set on said photographic optical axis; and a stopper for preventing said lens holder from moving out of an orbit between said first and second positions, wherein said stopper includes:

a stationary stopper pin;

an arc-shaped slot or recess, formed in said lens holder, having an arc shape with reference to said rotational center, having first and second ends, for receiving insertion of said stopper pin, said first and second ends being contacted by said stopper pin, to set said lens holder in respectively said first and second positions.

14. A lens-fitted photo film unit pre-loaded with photo film, comprising:

first and second taking lenses having focal lengths different from each other;

a movable lens holder for supporting said first and second taking lenses on a plane crosswise to a photographic optical axis;

an externally operable member for moving said lens holder to first and second positions, to set said first and second taking lenses on said photographic optical axis respectively when said lens holder is in said first and second positions;

a viewfinder optical system, settable at first and second viewfinder magnifications, and adapted to observation of a photographic field;

a magnification changer mechanism for setting said viewfinder optical system at said first and second viewfinder magnifications respectively when said first and second taking lenses are set on said photographic optical axis; and a holder regulation mechanism for positioning said lens holder in said first and second positions, said holder regulation mechanism including:

a first toggle spring, having one end secured to said lens holder, for biasing said lens holder toward said first and second positions respectively when said lens holder is offset from a dead point toward said first and second positions; and a stopper for preventing said lens holder from moving out of an orbit between said first and second positions; and a shutter mechanism, actuated upon a releasing operation, for providing an exposure in said photo film;

wherein said shutter mechanism includes a rotatable shutter blade for opening/shutting a light path about said photographic optical axis;

said first toggle spring is movable in a moving orbit disposed opposite to a rotating orbit of said shutter blade with reference to said photographic optical axis.

15. A lens-fitted photo film unit as defined in claim 14, wherein said first toggle spring includes a coil portion;

further comprising:

a support wall for supporting a rear of said lens holder movably; and a recess, formed in said support wall, for receiving entry of said coil portion when said first toggle spring moves.

16. A lens-fitted photo film unit pre-loaded with photo film, comprising:

first and second taking lenses having focal lengths different from each other;

a movable lens holder for supporting said first and second taking lenses on a plane crosswise to a photographic optical axis;

an externally operable member for moving said lens holder to first and second positions, to set said first and second taking lenses on said photographic optical axis respectively when said lens holder is in said first and second positions;

a viewfinder optical system, settable at first and second viewfinder magnifications, and adapted to observation of a photographic field, the viewfinder optical system including an objective lens, an eyepiece lens and a movable lens disposed therebetween; and a magnification changer mechanism for setting said viewfinder optical system at said first and second viewfinder magnifications respectively when said first and second taking lenses are set on said photographic optical axis, said magnification changer mechanism being constructed to move said movable lens along a viewfinder optical axis upon actuation of said lens holder, said magnification changer mechanism setting said movable lens in first and second lens positions on said viewfinder optical axis respectively when said lens holder is in said first and second positions to set said viewfinder optical system at respectively said first and second viewfinder magnifications;

wherein said magnification changer mechanism includes a rotatable transmission lever having first and second ends, said first end is pushed by said lens holder while said lens holder rotates between said first and second positions, to rotate said transmission lever in first or second direction, said second end is connected with said movable lens, for moving said movable lens toward said first and second lens positions respectively when said transmission lever rotates in said first and second directions.

17. A lens-fitted photo film unit as defined in claim 16, wherein the lens-fitted photo film unit further comprises:

a holder regulation mechanism for positioning said lens holder in said first and second positions, the holder regulation mechanism including a first toggle spring, having one end secured to said lens holder, for biasing said lens holder toward said first and second positions respectively when said lens holder is offset from a dead point toward said first and second positions;

wherein said magnification changer mechanism further includes:

a second toggle spring for biasing said transmission lever, said second toggle spring biasing said transmission lever in said first and second directions respectively upon rotation of said transmission lever in said first and second directions beyond a lever dead point thereof;

a stopper for stopping said movable lens upon a reach to said first and second lens positions.

18. A lens-fitted photo film unit as defined in claim 17, wherein said lens holder is rotatable about a rotational center, said first and second taking lenses are so disposed as to lie on a circle defined about said rotational center; and wherein said lens holder has first and second projections, disposed to lie on one circle defined about said rotational center, for pushing said first end of said transmission lever;

said first and second projections rotate said transmission lever in respectively said first and second directions;

rotation of said transmission lever biased by said second toggle spring causes said first end to move away from said first and second projections before said movable lens is set by said stopper in said first and second lens positions.

19. A lens-fitted photo film unit comprising:

first and second taking lenses having focal lengths different from each other;

a movable lens holder for supporting said first and second taking lenses on a plane crosswise to a photographic optical axis;

an externally operable member for moving said lens holder to first and second positions, to set said first and second taking lenses on said photographic optical axis respectively when said lens holder is in said first and second positions;

a viewfinder optical system, settable at first and second viewfinder magnifications, and adapted to observation of a photographic field;

a magnification changer mechanism for setting said viewfinder optical system at said first and second viewfinder magnifications respectively when said first and second taking lenses are set on said photographic optical axis;

a housing for containing said photo film, said first and second taking lenses, said lens holder and said viewfinder optical system;

a central opening, formed in a front wall of said housing so that said first and second taking lenses are disposed therein;

an auxiliary cover member, secured to said housing to cover said central opening;

a cover opening formed in said auxiliary cover member and in front of said first or second taking lens being set; and an outer sheet member for covering at least a partial surface of said housing, said outer sheet member having at least one portion disposed between said auxiliary cover member and said housing.

20. A lens-fitted photo film unit as defined in claim 19, wherein said auxiliary cover member is secured to said housing removably, and said externally operable member is movable on said auxiliary cover member.

21. A lens-fitted photo film unit comprising:

a housing pre-loaded with photo film;

first and second taking lenses, disposed in said housing, arranged crosswise to a photographic optical axis, and having focal lengths different from each other;

a taking lens changer mechanism, operable by external operation, for setting said first and second taking lenses selectively on said photographic optical axis;

a central opening, formed in a front wall of said housing, for containing said first and second taking lenses movably;

an auxiliary cover member, secured to said housing to cover said central opening, and through which light from a photographic field is introducible to said first or second taking lens; and an outer sheet member for covering at least a partial surface of said housing, wherein said outer sheet member has at least one portion disposed between said auxiliary cover member and said housing.

22. A lens-fitted photo film unit as defined in claim 21, wherein said auxiliary cover member is secured to said housing removably.

23. A lens-fitted photo film unit as defined in claim 22, wherein said taking lens changer mechanism comprises an externally operable member movable on said auxiliary cover member.

24. A lens-fitted photo film unit as defined in claim 21, wherein said auxiliary cover member includes a cover opening for causing said first or second taking lens to appear externally on said photographic optical axis.

25. A lens-fitted photo film unit as defined in claim 21, wherein said auxiliary cover member is transparent and protects said first and second taking lenses.

26. An assembling method of assembling a lens-fitted photo film unit including:

a housing pre-loaded with photo film;

an outer sheet member for covering at least a partial surface of said housing;

first and second taking lenses, disposed in said housing, arranged crosswise to a photographic optical axis, and having focal lengths different from each other;

a taking lens changer mechanism, operable by external operation, for setting said first and second taking lenses selectively on said photographic optical axis;

a central opening, formed in a front wall of said housing, for containing said first and second taking lenses movably;

an auxiliary cover member, secured to said housing to cover said central opening, and through which light from a photographic field is introducible to said first or second taking lens;

said assembling method comprising steps of:

securing said outer sheet member to said housing;

after said outer sheet member is secured, securing said auxiliary cover member to said housing.

27. An assembling method as defined in claim 26, wherein at least a portion of said outer sheet member is disposed between said auxiliary cover member and said housing.

28. An assembling method as defined in claim 27, wherein said auxiliary cover member has a cover opening, disposed on said photographic optical axis, for uncovering said first or second taking lens.

* * * * *

UNITED STATES PATENT AND TRADEMARK OFFICE
CERTIFICATE OF CORRECTION

PATENT NO.     : 6,449,430 B1                                    Page 1 of 1
DATED          : September 10, 2002
INVENTOR(S)    : Tasaka et al.

It is certified that error appears in the above-identified patent and that said Letters Patent is hereby corrected as shown below:

<u>Title page,</u>
Item [30], "Jan. 11, 1999" (both occurrences) should be -- Nov. 1, 1999 --.

Signed and Sealed this

Twenty-fifth Day of February, 2003

JAMES E. ROGAN
*Director of the United States Patent and Trademark Office*